United States Patent
Tien et al.

(10) Patent No.: US 7,273,202 B2
(45) Date of Patent: Sep. 25, 2007

(54) COMBINED SUPPORTING BASE

(75) Inventors: Chih-Wei Tien, Meishan Township, Chiayi County (TW); Wen-Ching Hsieh, Linkou Township, Taipei County (TW)

(73) Assignee: Benq Corporation, Taoyuan Shien (TW)

( * ) Notice: Subject to any disclaimer, the term of this patent is extended or adjusted under 35 U.S.C. 154(b) by 375 days.

(21) Appl. No.: 10/968,338

(22) Filed: Oct. 19, 2004

(65) Prior Publication Data
US 2005/0098700 A1  May 12, 2005

(30) Foreign Application Priority Data
Nov. 6, 2003 (TW) .............................. 92131152 A

(51) Int. Cl.
*F16M 13/00* (2006.01)
(52) U.S. Cl. .................. 248/417; 248/289.31; 248/922
(58) Field of Classification Search ............ 248/349.1, 248/346.04, 222.12, 222.51, 222.52, 222.11, 248/922, 917, 918, 919, 415, 417, 372.1, 248/371, 418, 289.31; 403/321, 326, 328
See application file for complete search history.

(56) References Cited

U.S. PATENT DOCUMENTS

| 4,589,713 | A | * | 5/1986 | Pfuhl et al. ................. 439/162 |
| 5,056,853 | A | * | 10/1991 | Van Order ................. 296/97.9 |
| 5,956,315 | A | * | 9/1999 | Sawai et al. ................. 720/708 |
| 6,398,179 | B1 | * | 6/2002 | Soles .......................... 248/617 |
| 6,789,976 | B2 | * | 9/2004 | Hung et al. ................... 403/84 |

* cited by examiner

*Primary Examiner*—Gwendolyn Baxter
(74) *Attorney, Agent, or Firm*—Thomas, Kayden, Horstemeyer & Risley

(57) ABSTRACT

A combined supporting base includes a base body, a fixing device, an elasticity device and a supporting frame having a hook. The base body has a first through hole, while the fixing device has a second through hole. The fixing device is rotatably disposed within the base body. The elasticity device is disposed between the base body and the fixing device. The supporting frame is coupled with the fixing device by inserting the hook into the first through hole to drive the fixing device or separated from the fixing device by rotating the fixing device to withdraw the hook from the first through hole.

10 Claims, 9 Drawing Sheets

COMBINED SUPPORTING BASE

This application claims the benefit of Taiwan application Serial No. 92131152, filed Nov. 6, 2003, the subject matter of which is incorporated herein by reference.

BACKGROUND OF THE INVENTION

1. Field of the Invention

The invention relates in general to a supporting base, and more particularly to a combined supporting base that may be easily assembled or dissembled.

2. Description of the Related Art

Apart from the conventional cold cathode fluorescent light display monitor, the display monitor of a TV or a personal computer is either a liquid crystal display or a plasma display. No matter what type of display is used, the body of the display is normally incorporated with a supporting base, enabling the display to stand firmly and face the user for his or her convenience of use.

Basically, a supporting base of a display is formed by coupling a base body with a supporting frame. The supporting frame joints the display, while the base body stabilizes the display, which is coupled to the supporting frame. To facilitate the downstream manufacturer with the assembly of the display and the supporting base, the upstream manufacturer normally provides a supporting base whose supporting frame and body base are already assembled together. For example, the supporting frame and the base body are screwed together.

Considering the transportation cost, an assembled supporting base whose supporting frame and body base are fixed together by joints or other fixing devices is disadvantageous because an assembled supporting base ends up with a larger volume and requires a larger packaging volume. As a result, the loading of the supporting base of a container cannot be further enhanced, leading to a high transportation cost.

SUMMARY OF THE INVENTION

It is therefore an object of the invention to provide a combined supporting base to effectively improve the loading of the supporting base of a container so as to effectively reduce the transportation cost.

The invention achieves the above-identified objects by providing a combined supporting base including a base body, a fixing device, an elasticity device and a supporting frame having a hook. The base body has a first through hole, while the fixing device has a second through hole corresponding to the first through hole. The fixing device is rotatably disposed within the base body. The elasticity device is disposed between the base body and the fixing device. The supporting frame having a hook is coupled with the fixing device or separated from the fixing device. When the hook is inserted into the first through hole to push a lateral edge around the first hole, the fixing device is driven to rotate toward a first direction and cause the elasticity device to be deformed. When the hook moves to be under the fixing device, the elasticity device drives the fixing device to rotate toward a second direction so that the hook is coupled with the fixing device, enabling the supporting frame to be combined with the fixing device. In addition, when the fixing device is rotated to withdraw the hook from the first through hole, the supporting frame is separated from the fixing device.

Other objects, features, and advantages of the invention will become apparent from the following detailed description of the preferred but non-limiting embodiments. The following description is made with reference to the accompanying drawings.

DETAILED DESCRIPTION OF THE INVENTION

The details of the invention are elaborated in a preferred embodiment. However, the scope of protection of the invention is not limited to the preferred embodiment. The preferred embodiment of the invention discloses a combined supporting base under the spirit of the invention. The characteristics of the technology of the invention are disclosed below.

Figure 1A:
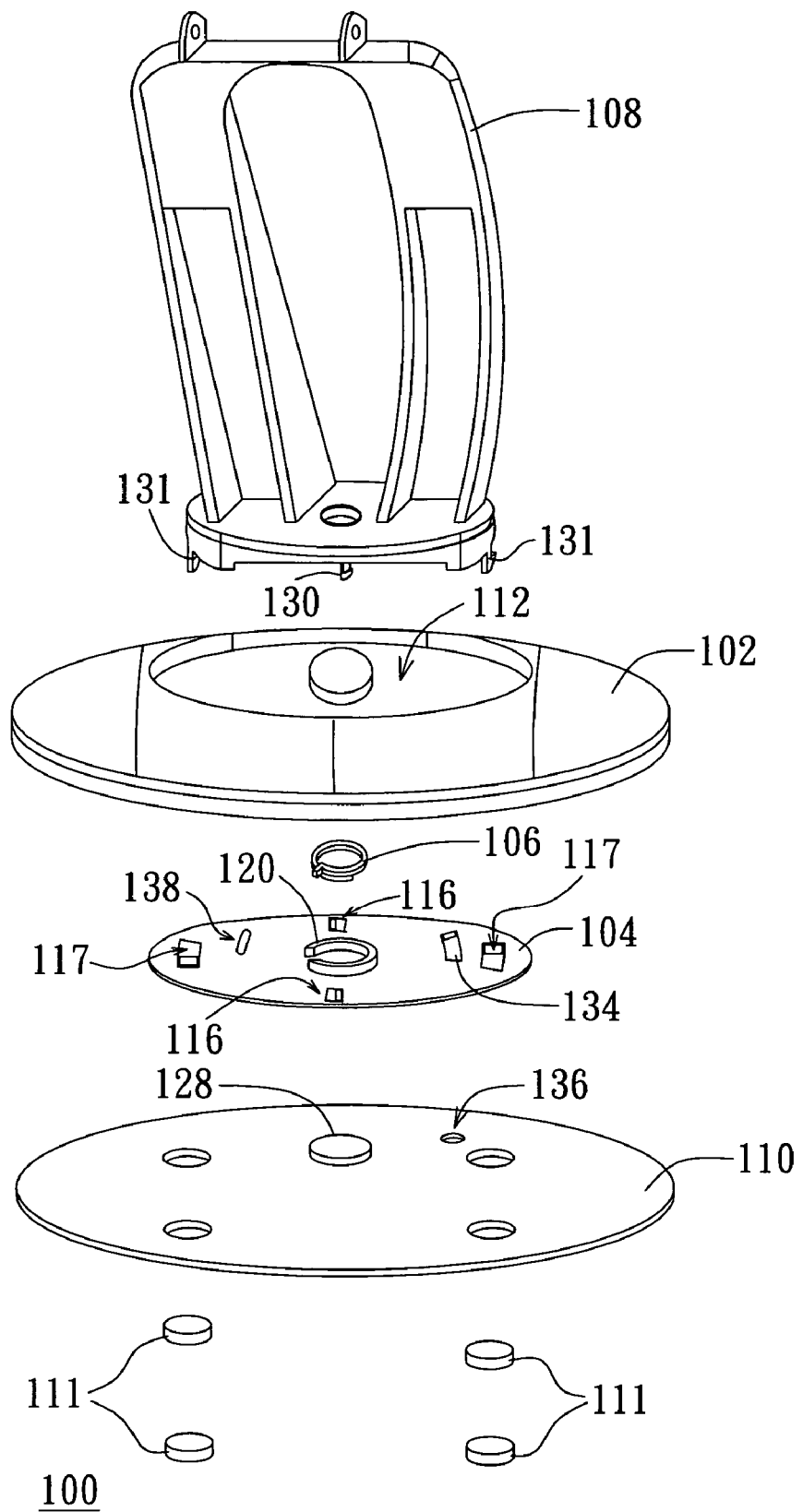
FIG. 1A is an exploded view of a combined supporting base according to a preferred embodiment of the invention.
Figure 1B:
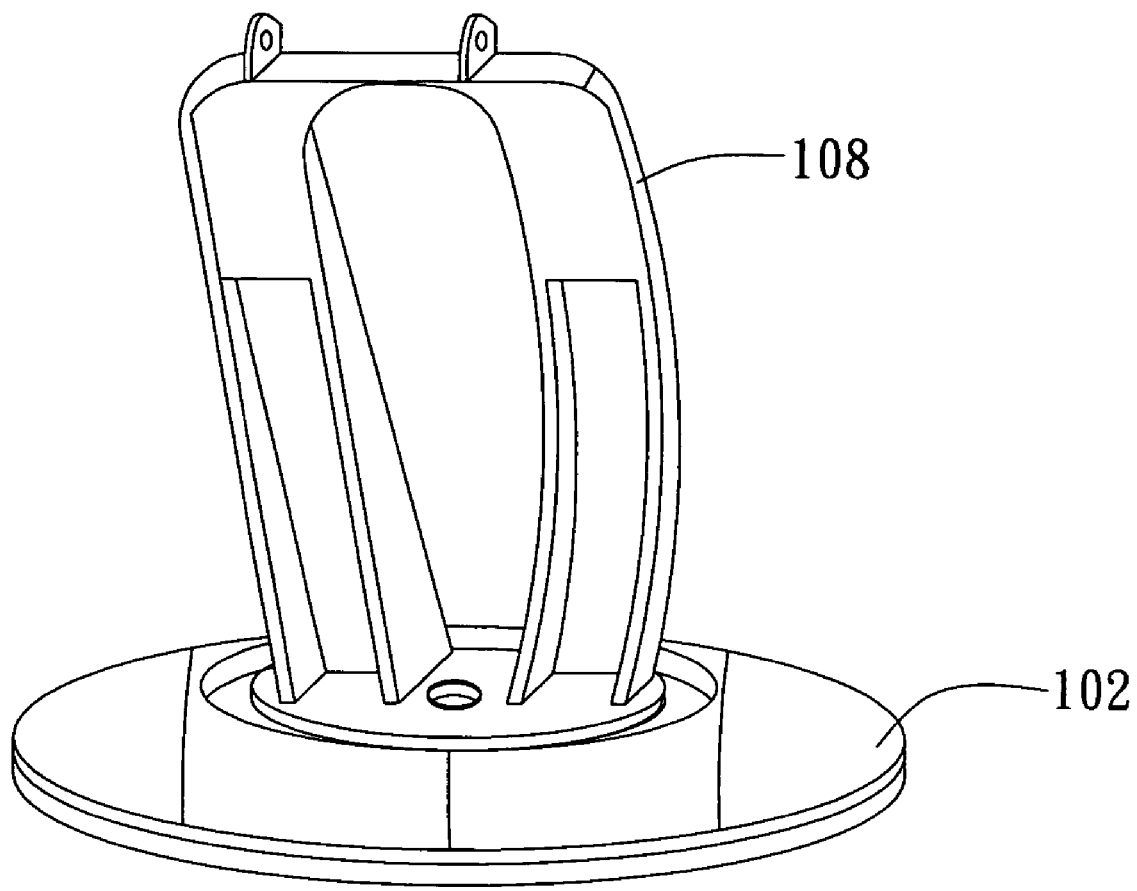
FIG. 1B shows the combined supporting base according to the preferred embodiment of the invention.

Refer to FIG. 1A and FIG. 1B at the same time. FIG. 1A is an exploded view of a combined supporting base according to a preferred embodiment of the invention, while FIG. 1B shows the combined supporting base of the invention. A combined supporting base 100 according to the invention mainly includes a base body, 102, a fixing device 104, an elasticity device 106, a supporting frame 110, a bottom plate 110, and plural pads 111 coupled with the bottom plate for anti-skidding.

Figure 2A:
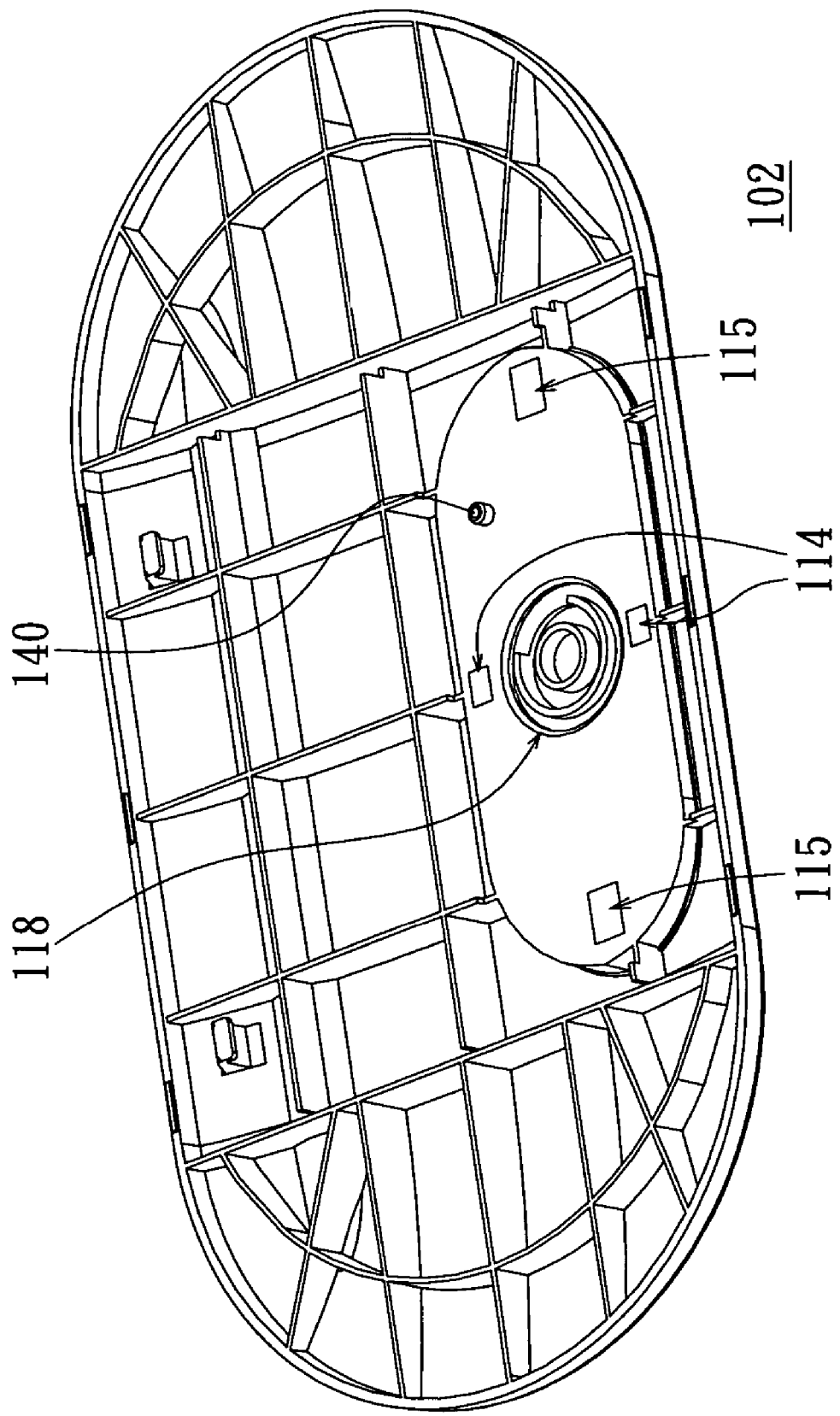
FIG. 2A is a bottom view of a base body of the combined supporting base.
Figure 2B:
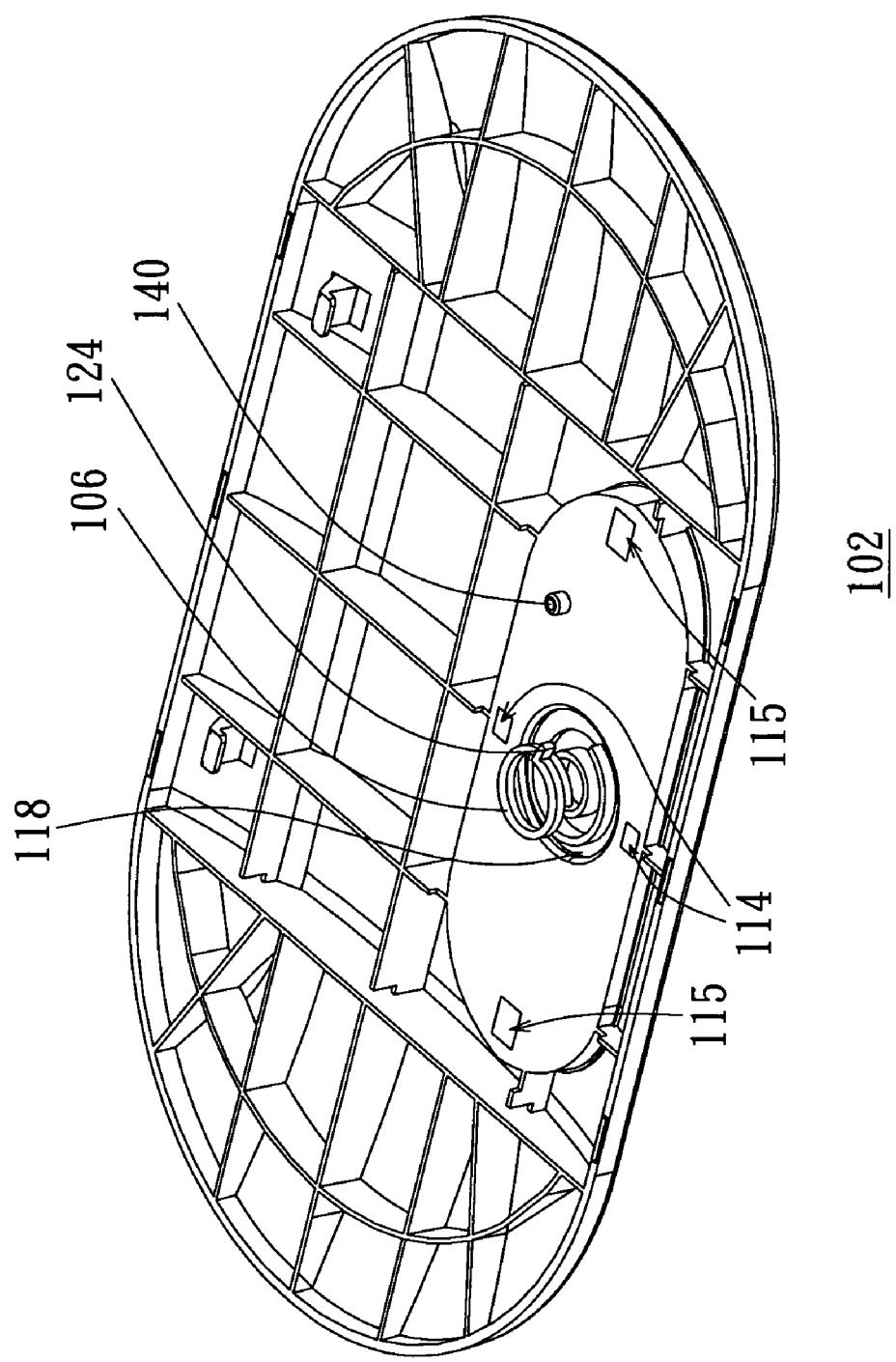
FIG. 2B is a diagram showing the status when an elasticity device is disposed at a first installation portion.

Refer to FIG. 1A, FIG. 2A and FIG. 2B at the same time. FIG. 2A is a bottom view of a base body of the combined supporting base, while FIG. 2B is a diagram showing the status when an elasticity device is disposed at a first installation portion. For the purpose of explanation, both FIG. 2A and FIG. 2B show the bottom of the base body 102. The base body 102 has a junction portion 112 indented into the base body 102. The supporting frame 108 is jointed to the base body via the junction portion 112.

Figure 3:
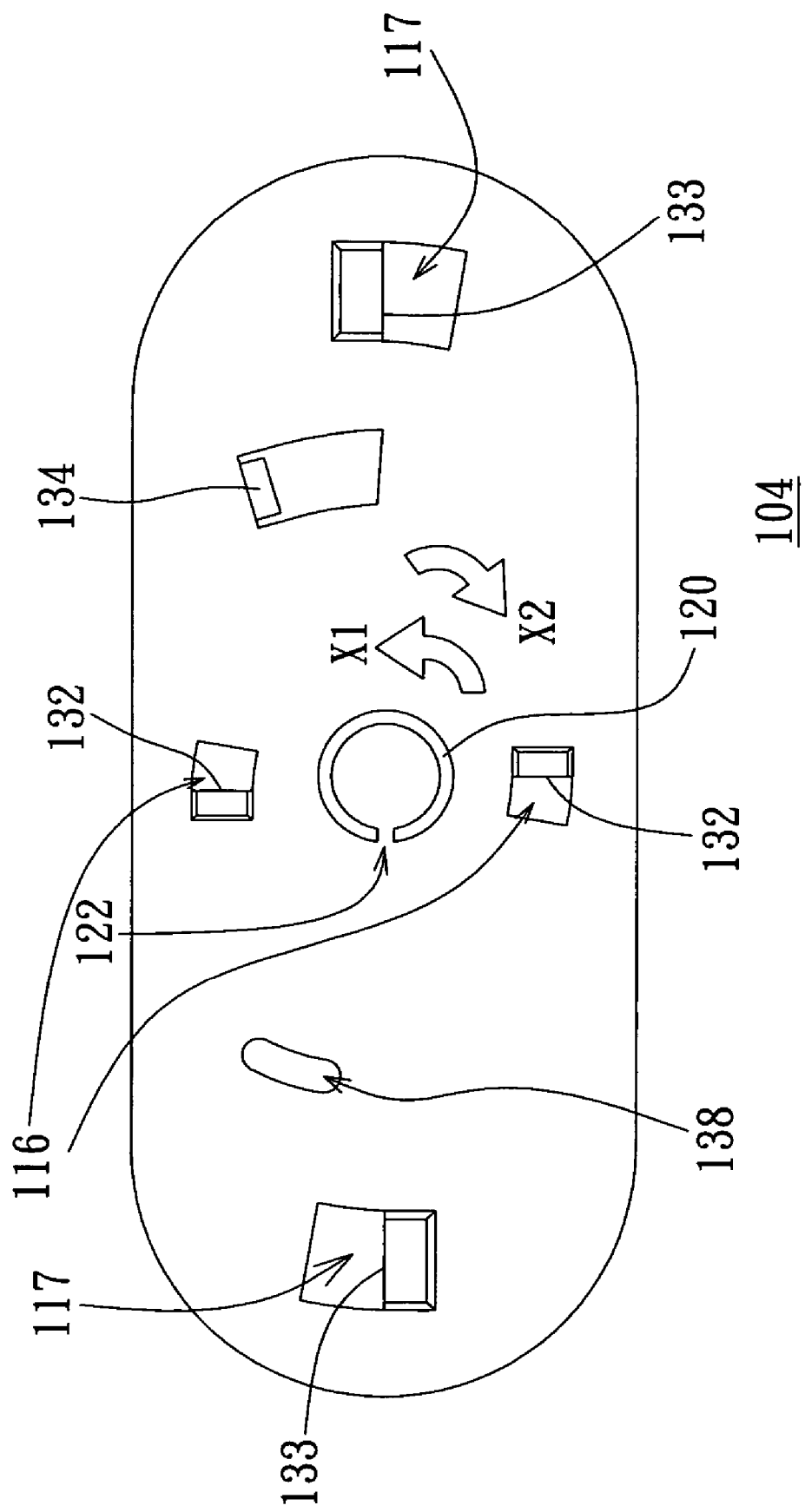
FIG. 3 is a top view of a fixing device.

Refer to FIG. 1A, FIG. 2A, FIG. 2B and FIG. 3 at the same time. FIG. 3 is a top view of a fixing device. Plural first through holes 114 and 115 are formed on the junction portion 112, while plural second through holes 116 and 117 respectively corresponding to these first through holes 114 and 115 are formed on the fixing device 104. A first installation portion 118, which looks like a groove, is formed on the base body 102, while a second installation portion 120 is formed on the fixing device 104. The second installation portion 120 has a gap 122 and corresponds to the first installation portion 118. The elasticity device 106 whose terminal end 124 is embedded into the gap 122 is disposed between the first installation portion 118 and the second installation portion 120.

Figure 4A:
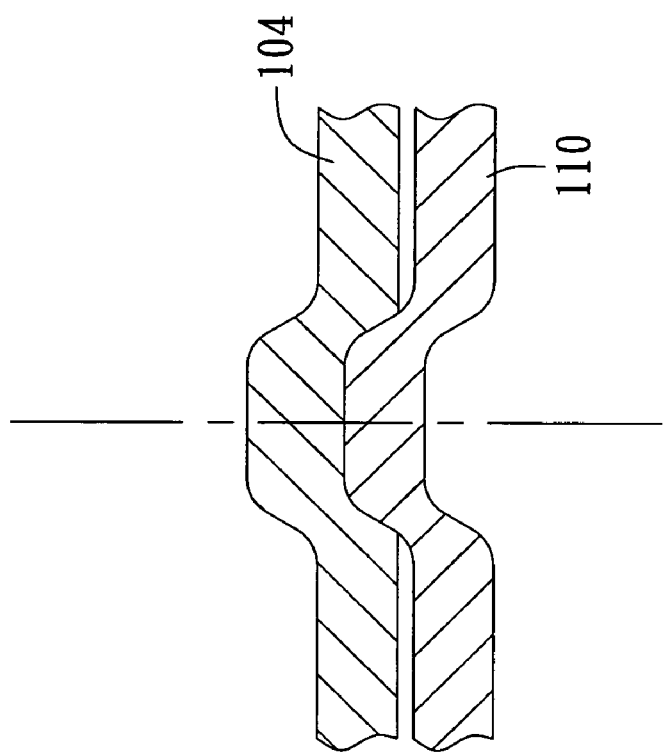
FIG. 4A is a partial diagram showing the status before the fixing device is coupled to a bottom plate.
Figure 4B:
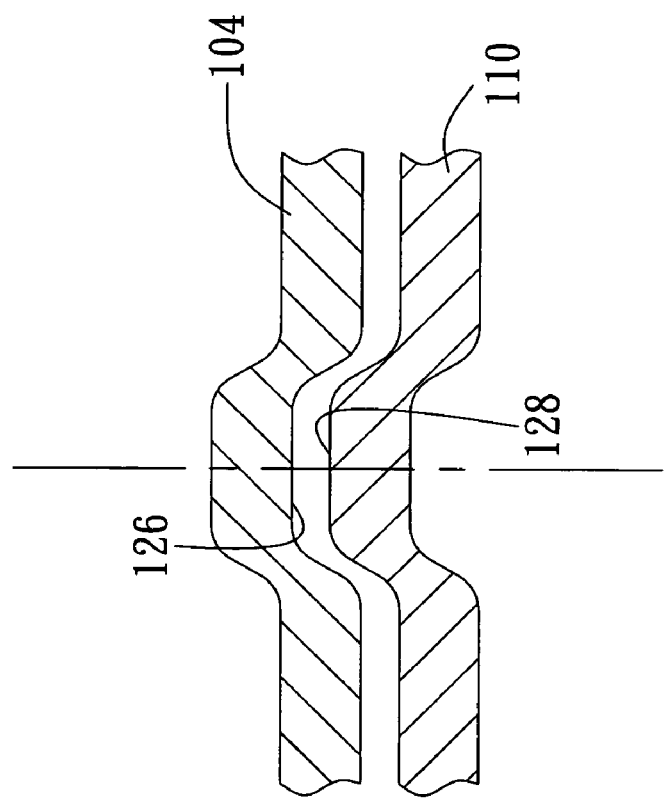
FIG. 4B is a partial diagram showing the status after the fixing device is coupled to the bottom plate.

Refer to FIG. 4A and FIG. 4B at the same time. FIG. 4A is a partial diagram showing the status before the fixing device is coupled to a bottom plate, and FIG. 4B is a partial diagram showing the status after the fixing device is coupled to the bottom plate. An indentation 126 is formed on the fixing device 104, while a first protrusion 128 corresponding to the indentation 126 is formed on the bottom plate 110. By combining the indentation 126 with the first protrusion 128 of the bottom plate 110 as shown in FIG. 4B, the fixing device 104 may use the indentation 126 as an axis to pivotally mount on the bottom plate 110.

As shown in FIG. 1A, the bottom plate 110 is coupled with the base body 102; the fixing device 104, after coupling with the bottom plate 110 as shown in FIG. 4B, may rotate relative to the bottom plate 110 and the base body 102. Therefore, the elasticity device 106 is disposed between the base body 102 and the fixing device 104, wherein the fixing device 104 and the elasticity device 106 are both disposed between the base body 102 and the bottom plate 110. According to the invention, the assembly of the combined supporting base may be achieved by coupling the supporting frame 108 to the fixing device 104.

Refer to FIG. 1A, FIG. 2B and FIG. 3 at the same time. The supporting frame 108 has near rigid hooks 130 and 131. As the supporting frame 108 is to be coupled with the fixing device 104, the hook 130 is inserted into the first through hole 114 from above as shown in FIG. 2B and pushes a lateral edge 132 around the second through hole 116 positioned on the fixing device 104, so that the fixing device 104 is driven to rotate toward a first direction X1 and cause the elasticity device 106 to be deformed. As the hook 130 moves to be under the fixing device 104 so the fixing device 104 is no more stopped by the hook 130. The elasticity device 106 drives the fixing device 104 to rotate toward a second direction X2 opposite to the first direction X1 so that the hook 130 is coupled with the fixing device 104, enabling the supporting frame 108 to be combined with the fixing device 104. The hook 131 strengthens the stability of the joint of the supporting frame 108 and the fixing device 104. Likewise, when the hook 130 is inserted into the second through hole 116, the hook 131 is inserted into the second through hole 117 to be coupled with the fixing device 104.

By rotating the fixing device 104 to withdraw the hook 130 and the hook 131 from the first through hole 114 and the first hole 115 respectively, the supporting frame 108 is separated from the fixing device 104. The way to rotate the fixing device 104 is to form a grip 134 bent downwardly on the fixing device 104 and further form a third through hole 136 on the bottom plate 110. The grip 134 is exposed outside the third through hole 136 when the bottom plate 110 is coupled with the base body 102. The fixing device 104 is rotated by passing through the third through hole 136 to turn the grip 134 around.

Refer to FIG. 1A, FIG. 2B and FIG. 3 again. A guiding slot 138 is formed on the fixing device 104, while a second protrusion 140 is formed on the bottom of the base body 102. The second protrusion 140 slides along the guiding slot 138 to position the fixing device 104 and guide the fixing device 104 to rotate.

Figure 5A:
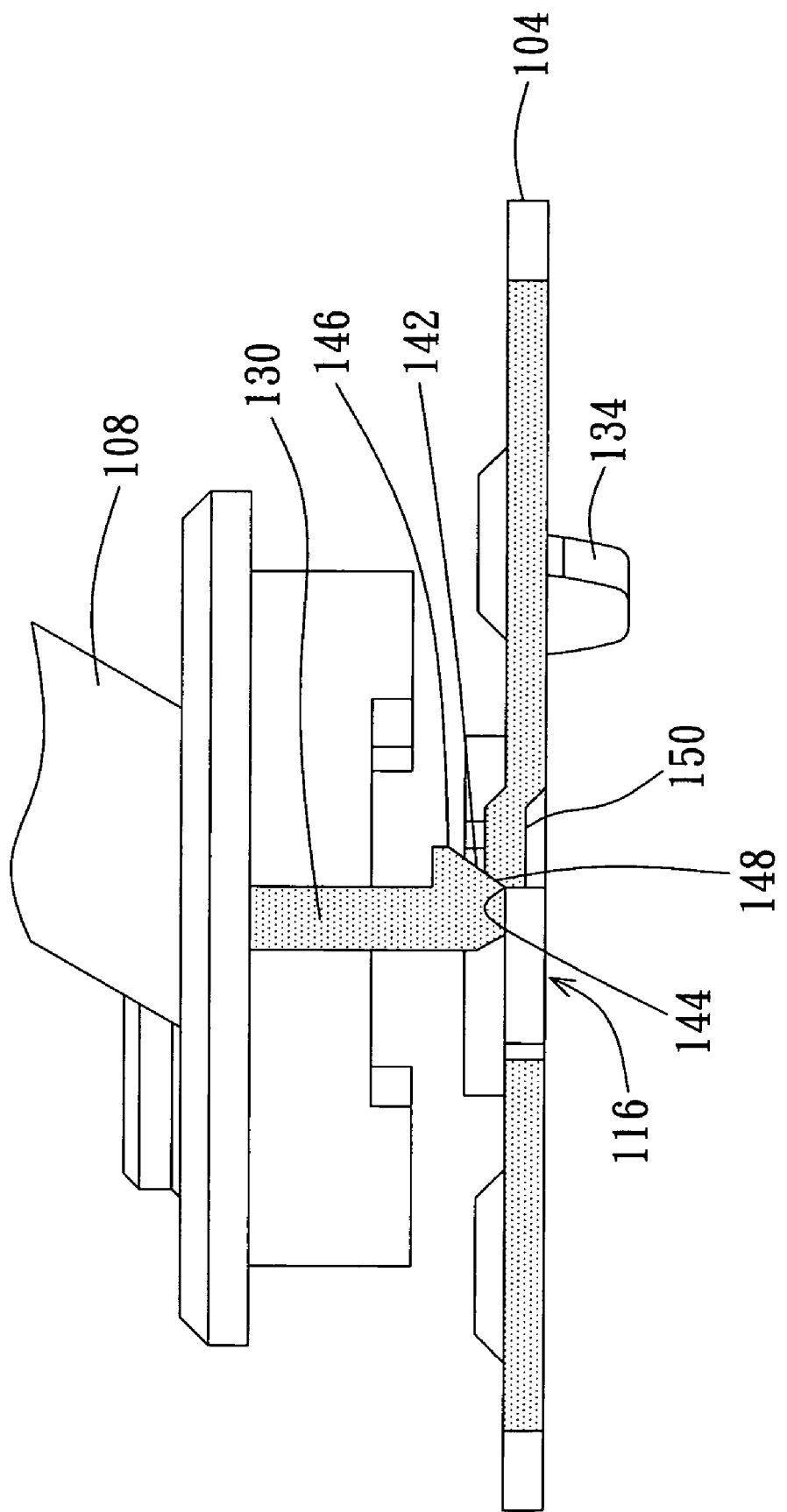
FIG. 5A is a diagram showing the status when a first end of a sloping side of a hook pushes a first end surface of the fixing device.
Figure 5B:
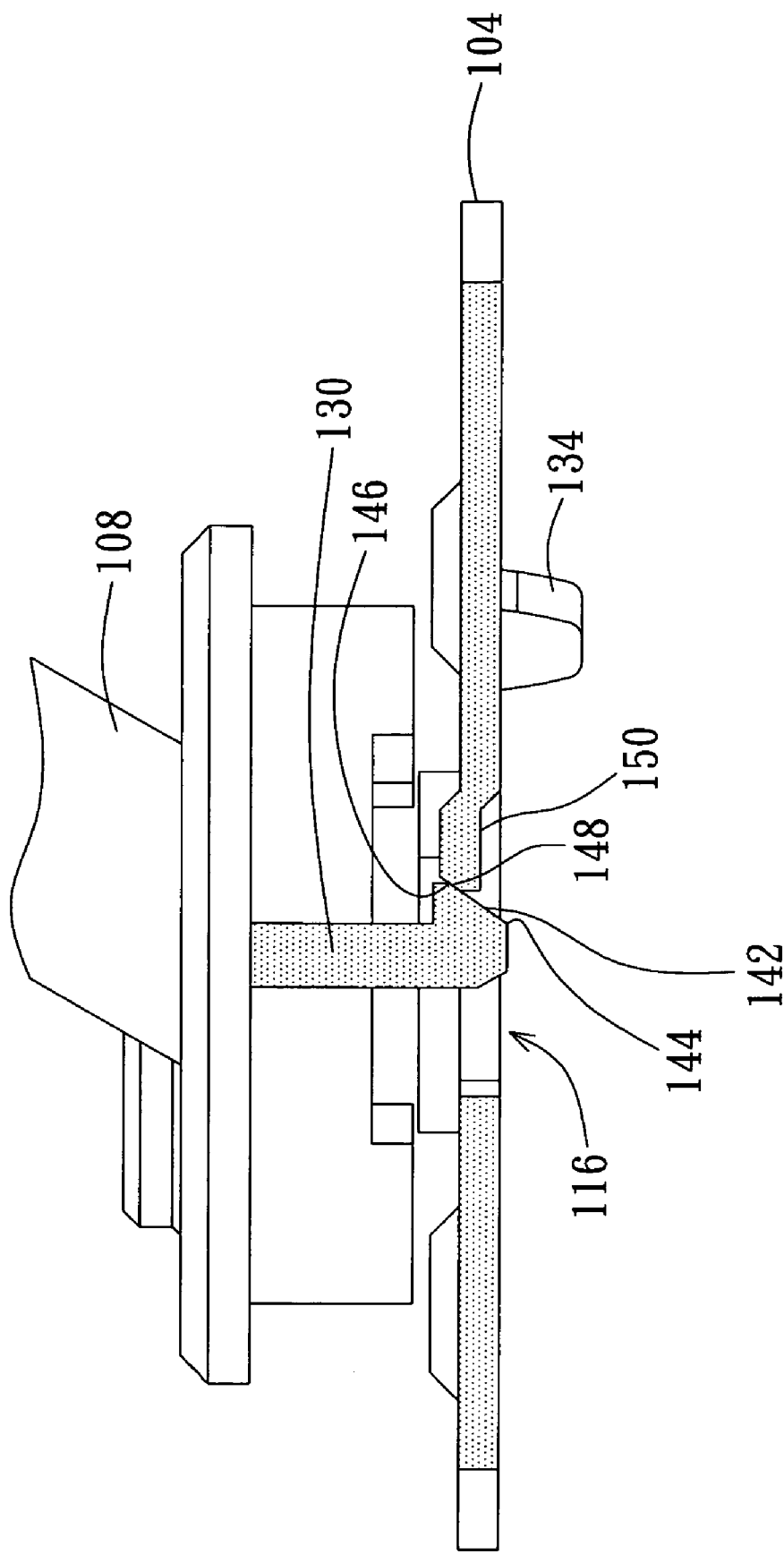
FIG. 5B is a diagram showing the status when a second end of the sloping side of the hook pushes the first end surface of the fixing device.
Figure 5C:
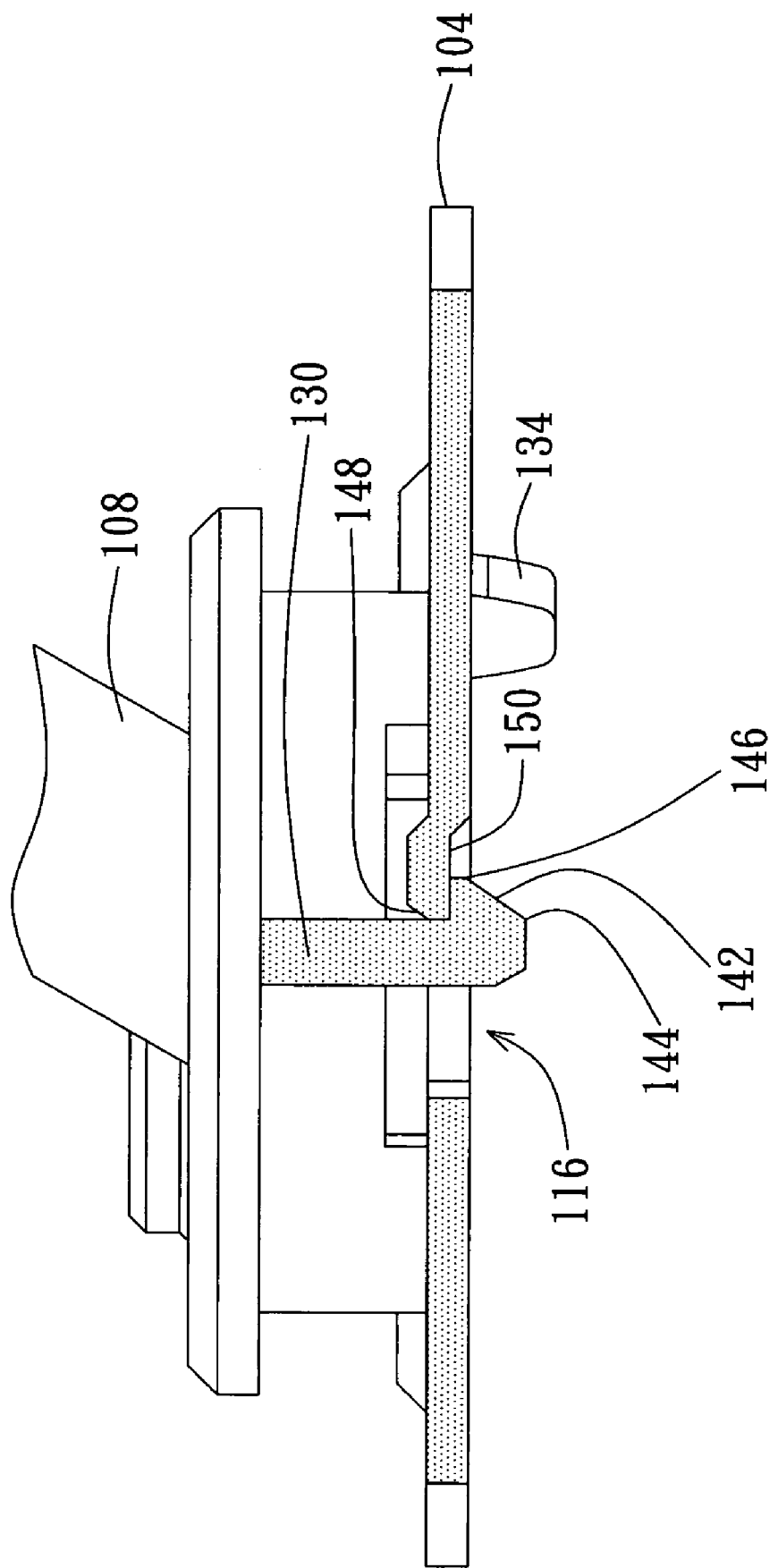
FIG. 5C is a diagram showing the status as the hook moves to be under the fixing device.

By means of a mutual mechanism between the hooks 130 and 131 disposed on the supporting frame 108 and the fixing device 104 disposed on the base body 102, the assembly of the combined supporting base according to the invention is achieved. Referring to FIG. 1A, FIG. 5A, FIG. 5B and FIG. 5C at the same time, the details of this mechanism are further elaborated. FIG. 5A is a diagram showing the status when a first end of a sloping side of a hook pushes a first end surface of the fixing device; FIG. 5B is a diagram showing the status when a second end of a sloping side of the hook pushes a first end surface of the fixing device; and FIG. 5C is a diagram showing the status as the hook moves to be under the fixing device. In FIG. 5A, FIG. 5B and FIG. 5C, only the supporting frame 108 and the fixing device 104 are illustrated.

As shown in FIG. 5A, the hook 130 disposed on the supporting frame 108 has a sloping surface 142. The sloping surface 142 further has a first end 144 and a second end 146. The fixing device 104 has a first end surface 148 and a second end surface 150, both of which contact the lateral edge around the second through hole 116. If the supporting frame 108 is to be coupled with the fixing device 104, the first end 144 of the sloping surface 142 of the hook 130 pushes the first end surface 148 positioned on the lateral edge around the second through hole 116. Refer to both FIG. 5A and FIG. 5B. As the hook 130 moves downwards, the fixing device 104 is driven by the interactive force between the first end surface 148 and the sloping surface 142 to rotate along the first direction X1 (shown in FIG. 3) and cause the elasticity device (not shown here) to be deformed until the top of the second end 146 of the sloping surface touches the rear of the first end surface 148 as shown in FIG. 5B. As shown in FIG. 5C, as the hook 130 continues to move downwards to be under the fixing device 104, the hook 130 no longer stops the movement of the fixing device 104. Meanwhile, the elasticity of the deformed elasticity device will drive the fixing device 104 to rotate along the second direction X2 shown in FIG. 3, enabling the hook 130 to touch the second end surface 150 so that the supporting frame 108 and the fixing device 104 are hooked together.

It can be seen from the above disclosures that the combined supporting base 100 according to the invention is easy to be assembled and disassembled. Before delivering the combined supporting base to a lower stream manufacturer, an upper stream manufacturer may disassemble the combined supporting base to be packed in a smaller box so as to increase the loading of a container and to reduce the transportation cost accordingly. The combined supporting base according to the invention saves transportation cost due to the feature of easy assembly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A combined supporting base comprising
a base body having a first through hole;
a fixing device having a second through hole corresponding to the first through hole, wherein the fixing device is rotatably disposed within the base body;
an elasticity device disposed between the base body and the fixing device;
a supporting frame having a hook, for being coupled with the fixing device or being separated from the fixing device;

edge around the second through hole, the fixing device is driven to rotate toward a first direction and cause the elasticity device to be deformed, and wherein when the hook moves to be under the fixing device, the elasticity device drives the fixing device to rotate toward a second direction so that the hook is coupled with the fixing device, enabling the supporting frame to be combined with the fixing device; and wherein when the fixing device is rotated to withdraw the hook from the first through hole, the supporting frame is separated from the fixing device.

2. The combined supporting base according to claim 1, wherein the first direction is opposite to the second direction.

3. The combined supporting base according to claim 1, wherein the hook has a sloping surface, which has a first end and a second end, and the fixing device has a first end surface and a second end surface, both of which contact the lateral edge around the second through hole; and wherein when the first end of the sloping surface pushes the first end surface of the fixing device, the hook moves downwards so that the fixing device is driven by an interactive force between the first end surface and the sloping surface to rotate along the first direction and cause the elasticity device to be deformed until the top of second end of the sloping surface touches the rear of the first end surface, and when the hook moves to be under the fixing device, the elasticity of the deformed elasticity device drives the fixing device to rotate along the second direction, enabling the hook to touch the second end surface so that the supporting frame and the fixing device are hooked together.

4. The combined supporting frame base according to claim 1, wherein a first installation portion is formed on the base body while a second installation portion, which has a gap and corresponds to the first installation portion, is formed on the fixing device, and the elasticity device is disposed between the first installation portion and the second installation portion.

5. The combined supporting frame base according to claim 4, wherein the first installation portion is a groove.

6. The combined supporting frame base according to claim 1, wherein a grip is formed on the fixing device, and a third through hole, which allows the grip to be exposed outside, is formed on the base body, and wherein the fixing device is rotatable by passing through the third through hole to turn the grip around.

7. The combined supporting frame base according to claim 1, wherein the combined supporting base further comprises a bottom plate coupled with the base body, the fixing device is rotatably coupled with the bottom plate, and the elasticity device and the fixing device are disposed between the base body and the bottom plate.

8. The combined supporting frame base according to claim 7, wherein the fixing device has an indentation and the bottom plate has a first protrusion corresponding to the indentation, and when the indentation is combined with the first protrusion, the fixing device pivotally mounts on the bottom plate.

9. The combined supporting frame base according to claim 1, wherein the fixing device has a guiding slot and the base body has a protrusion, which is slidable along the guiding slot, and wherein the protrusion positions the fixing device and guides the fixing device to rotate by means of the guiding slot.

10. The combined supporting base according to claim 1, wherein the hook is near rigid.

* * * * *